United States Patent [19]

Horton

[11] 4,285,808

[45] Aug. 25, 1981

[54] TRUCK MIXER WASHOUT RECLAIM SYSTEM

[75] Inventor: Robert J. Horton, Wauwatosa, Wis.

[73] Assignee: Rexnord Inc., Milwaukee, Wis.

[21] Appl. No.: 206,600

[22] Filed: Nov. 13, 1980

[51] Int. Cl.[3] .......................... B03B 5/64; B03B 7/00; B03D 3/00

[52] U.S. Cl. ........................................ 209/17; 209/44; 209/208; 209/942; 198/369

[58] Field of Search ........................ 209/17, 44, 2, 208, 209/247, 253, 268, 269, 463, 464, 942, 655, 924; 210/526; 198/369

[56] References Cited

U.S. PATENT DOCUMENTS

| | | | |
|---|---|---|---|
| 1,131,038 | 3/1915 | Christy | 198/369 |
| 2,105,584 | 1/1938 | Christensen | 209/208 |
| 3,596,759 | 8/1971 | King et al. | 209/2 |
| 3,695,427 | 10/1972 | Friesz | 209/2 X |
| 3,997,434 | 12/1976 | Macauley | 209/10 |
| 4,154,671 | 5/1979 | Borges | 209/269 X |

FOREIGN PATENT DOCUMENTS

| | | | |
|---|---|---|---|
| 2647130 | 4/1978 | Fed. Rep. of Germany | 209/17 |
| 2651393 | 5/1978 | Fed. Rep. of Germany | 209/17 |

*Primary Examiner*—Ralph J. Hill

[57] ABSTRACT

A reclamation system for receiving unused mixed concrete ingredients and the washout water therewith includes an elongated, on grade gravity separation tank having an upper discharge end over an on grade grout receiving area, an inclined belt conveyor which is pivotally mounted for limited rotation on a vertical axis between a first position alongside the tank and said grout receiving area and a second position having its lower end over said area and below said tank discharge end and having its upper discharge end over an aggregate and sand receiver.

6 Claims, 3 Drawing Figures

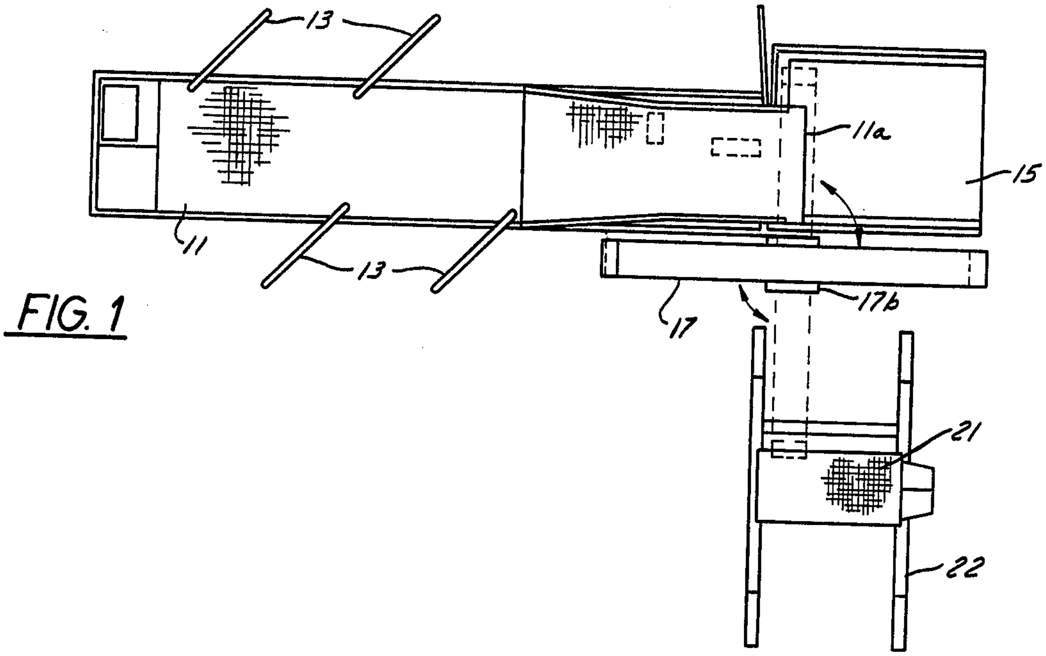
FIG. 1
FIG. 2
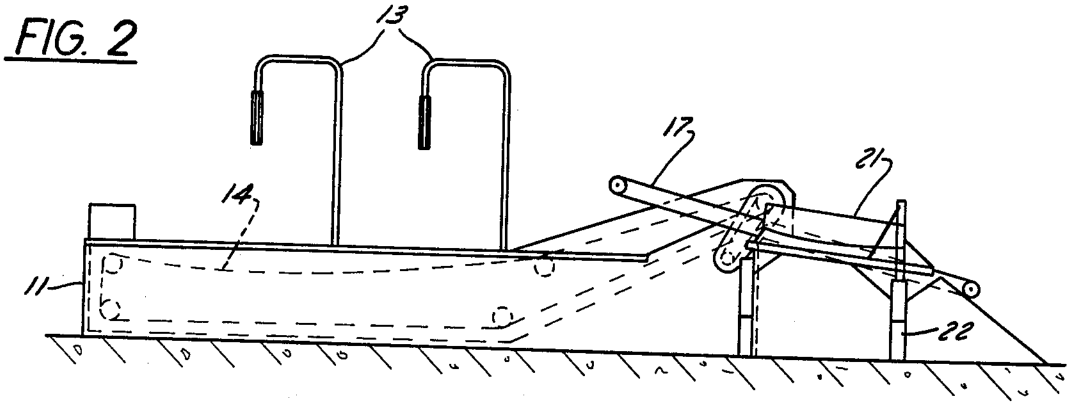
FIG. 3
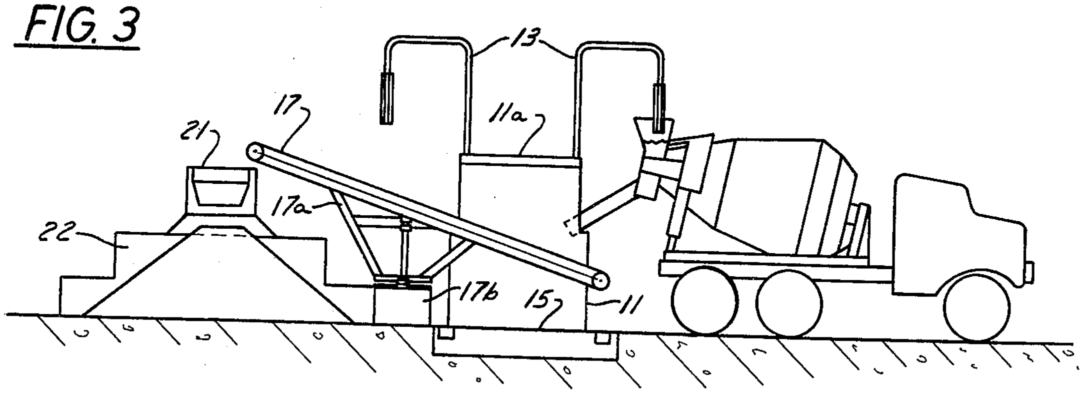

TRUCK MIXER WASHOUT RECLAIM SYSTEM

BACKGROUND OF THE INVENTION

Truck mixers for the delivery of the mixed ingredients of concrete must be washed out at the end of a work period or day and before the usual remaining concrete hardens and is then extremely difficult to remove. The separation of the sand and gravel from the washout water for their reusing is readily provided for with a settling tank. However, the cement does not settle as readily and the recovered cement is not reusable.

A typical prior art washout reclamation system includes a long tank from which some number such as four to eight truck mixers may draw the required washout water and into which the washout is directed for the subsequent separation of the several materials. Scrapers operated by parallel chains push the settled material up the inclined end of the tank for removal and normally operate continuously at a very low speed to prevent the curing cement from "freezing up" the chains.

As soon as and while washout water is being withdrawn from the tank, the chains operate at a relatively high speed to remove the aggregate and sand which settle immediately. A deflector directs these materials onto a belt conveyor which carries them to a storage location. Such separation and removal of the aggregate and sand is completed in only a few minutes after the last of a series of truck mixers have been washed out. The chain and scrapers then resume their continuous slow speed operation and the mentioned deflector is moved so that the continuing discharge of the cement slurry or grout will fall directly into a storage pit directly below the discharge end of the tank. The cement settles and the grout is discharged from the tank only very slowly and similarly accumulates slowly in the pit where it may harden. When the accumulation warrants, a front end loader is driven into the pit and the grout or the hardened cement is broken up and removed for disposal generally as land-fill.

A relatively large pit is necessary to receive the grout and must extend below the belt conveyor. The required below-grade elevation of the floor of the pit requires guard rails and other provisions such as drainage.

The present invention derives from attempts to extend the deflector so that no part of the conveyor need be over the pit with the thought that the deflector then could be moved somehow whenever the accumulated grout is to be removed such that a relatively shallow pit would then be permitted.

Such attempts have not been practicably successful. The main difficulty, of course, is that the deflector as a gravity conveyor requires a considerable downward incline.

The present invention has as its main object to allow a shallow pit for the spent cement or grout to extend below the belt conveyor and requires no deflector.

SUMMARY OF THE INVENTION

A reclamation system for receiving unused mixed concrete ingredients and the washout water therewith includes an elongated, on grade gravity separation tank having an upper discharge end over an on grade grout receiving area, an inclined belt conveyor which is pivotally mounted for limited rotation on a vertical axis between a first position alongside the tank and said grout receiving area and a second position having its lower end over said area and below said tank discharge end and having its upper discharge end over an aggregate and sand receiver.

DESCRIPTION OF THE SEVERAL VIEWS OF THE DRAWING

FIG. 1 is a plan view of the reclamation system and of the aggregate and sand shaker. The conveyor as shown in broken lines is in its second position.

FIG. 2 is a side elevation of the system and of the shaker.

FIG. 3 is an end view of the system and shows the conveyor in its second position extending to the shaker.

DESCRIPTION OF THE PREFERRED EMBODIMENT SHOWN IN THE DRAWINGS

The reclamation system shown in the drawings is arranged for location on a graded area of the truck yard of a concrete batch plant.

The long rectangular tank 11 stores the washout water to be used for cleaning out the drums of the truck mixers at the end of each working period or day. The stored water includes some make-up water and the previously used water which includes the minor amount of cement which remains suspended in the water.

Tank 11 is arranged so that some number of truck mixers may be backed up to the tank and receive the washout water from the standpipes 13, including two on each side of the tank as shown. For that purpose, each standpipe includes a terminal downward hanging flexible hose section. Each side of tank 11 is also low enough so that the washout may be discharged by chute directly into the tank.

Tank 11 is of steel construction and has a flat settling floor. One end of the tank is inclined to form a beach for the chain and scraper mechanism 14 which pushes the settled material up the beach and over the elevated discharge end 11*a* of the tank.

Mechanism 14 operates continuously at a slow speed and normally functions continuously to push the slowly settling cement with some entrained water over end 11*a* of the tank. Such cement or grout accumulates as a pile below the discharge end of the tank. For that purpose, the square concrete slab 15 with a surrounding overflow gutter is provided.

One side of slab 15 extends under the discharge end 11*a* of tank 11. The belt conveyor 17 in its usual position is shown in full lines in FIG. 1 and as will be further described, extends alongside the tank 11 and an adjoining side of slab 15. The two other sides of slab 15 are unobstructed for access of such as a front end loader for the removal of the accumulated grout. Such removal may be effected at any time expecting only during the period while one or more trucks are being washed out and a preselected period of such as one-half hour immediately thereafter as will be explained.

The conveyor 17 includes the supporting frame 17*a* which is pivotally supported on the pedestal 17*b* for movement about a vertical axis so that the lower loading end of the conveyor may be positioned below the discharge end 11*a* of tank 11. Power means such as a hydraulic cylinder connected to a crank arm, not shown, is readily provided to effect the 90° of required rotation. The conveyor may swing slowly such as one degree per second and without hazard. Typically one and one-half minutes may be required.

Conveyor 17 provides for the transport of the materials on the belt to and over the upper discharge end of the conveyor which is positioned over the screen shaker 21.

Shaker 21 in its simplest form includes a single vibrating screen of the desired mesh which will allow the sand to pass through the screen onto a receiving and temporary storage pile immediately beneath the screen. The screen is also inclined slightly so that the aggregates which are too large to pass through the screen will tumble toward and from the lower margin of the screen and onto a receiving pile. Part of the structure supporting the screen shaker 21 includes the wall 22 which separates the sand and the aggregate piles.

As indicated in the first and normal mode of operation of the system, mechanism 14 operates at a slow speed of such as one foot (30 cm) per minute, and the conveyor 17 is inoperative and positioned alongside tank 11 as shown in full lines in FIG. 1.

Controls, not shown, are provided so that when a truck mixer operator turns on the wash water for its delivery through a standpipe 13, the second mode of operation of the system is either initiated or continued. If the second mode is initiated, mechanism 14 begins its high speed operation at such as 20 feet (6 m) per minute and a timer is started. This timer effects an adjustable delay of the movement of conveyor 17 so that the conveyor will reach its second position after a delay of such as between two and four minutes after the operator has started to wash out a truck mixer drum. This delay is adjustable to approximate the elapsed time before the first aggregate and sand of the wash water will have settled in tank 11 and be pushed up to the discharge end 11*a* of tank 11. The operation of conveyor 17 is initiated as it reaches its second position to receive the aggregate and sand. The operation of mechanism 14 at high speed and of conveyor 17 continues as long as any wash water is being withdrawn from tank 11 through any of standpipes 13 and for the mentioned preselected period thereafter. During that period, essentially all of the aggregate and sand will have been removed from tank 11.

At the end of that period, the control means then shuts down shaker 21, the operation of conveyor 17 is discontinued, its return to its regular position alongside tank 11 is initiated and the slow speed operation of mechanism 14 is resumed.

The normal position of the conveyor alongside tank 11 again allows ready access to the grout on slab 15 for its removal when convenient. The slow speed operation of mechanism 14 continues until the next trucks are to be washed out.

I claim:

1. A system for reclaiming the unused mixed concrete ingredients and the washout water by which such ingredients have been removed from their containers and for delivering the reclaimed aggregate and sand to a receiver disposed over graded areas for their storage, and reuse, said system comprising a rectangular settling tank having a flat floor and an inclined end forming a beach, said tank being adapted to hold the previously used washout water and having means for delivery of such water to one or more of the containers referred to and an upper opening to receive the washout therefrom, a chain and scraper mechanism including high and low speed drive means therefor, and being disposed in the tank to push the settled washout material up said beach and to discharge the same over said end of the tank, means defining a graded area below said discharge end of the tank and disposed to receive the grout discharged therefrom, inclined belt conveyor having a lower loading end, an upper discharge end and a support frame, and a base for said belt conveyor having bearing means for the limited pivotal movement of the conveyor about a vertical axis and between operative and inoperative positions, said ends of the conveyor being respectively alongside the tank and alongside said graded area means in said inoperative position and respectively over said aggregate and sand receiver and below the tank discharge end in said operative position, said low speed drive being operable to effect the removal of the cement from the tank while the conveyor is inoperative and said high speed drive means being operable with the conveyor for the limited periods required to effect the removal of the aggregate and sand and its delivery as to said receiver.

2. The system of claim 1 wherein the means defining the graded area is a flat concrete slab over which powered equipment such as a front end loader is operable.

3. The system of claim 2 wherein the concrete slab includes gutters at its perimeter for receiving the water which drains from the grout which may accumulate on the slab.

4. In a system for reclaiming the unused mixed concrete ingredients and the washout water by which such ingredients have been removed from their containers and for receiving the same for their storage and reuse, said system including a settling tank, inclined means for the removal of the settled material from the tank and having an elevated discharge end, a graded area directly below said discharge end, an aggregate and sand receiver spaced from said graded area, an inclined belt conveyor having a lower loading end, an upper discharge end and a support frame, and a base for said belt conveyor having bearing means for the limited pivotal movement of the conveyor about a vertical axis and between operative and inoperative positions whereby in said operative position the discharge end of the conveyor is above said receiver and the lower end is above said graded area and below said discharge end and in said inoperative position the lower end of the conveyor is alongside said graded area.

5. The system of claim 4 wherein the graded area is a flat concrete slab over which powered equipment such as a front end loader is operable.

6. The system of claim 5 wherein the concrete slab includes gutters at its perimeter for receiving the water entrained with the cement and which drains therefrom.

* * * * *